United States Patent
Nelson (10) Patent No.: US 11,014,329 B2
(45) Date of Patent: May 25, 2021

(54) LOAD BEARING PANEL

(71) Applicant: Century Plastics, LLC, Shelby Township, MI (US)

(72) Inventor: Jeffery M. Nelson, Imlay City, MI (US)

(73) Assignee: Century Plastics, LLC, Shelby Township, MI (US)

( * ) Notice: Subject to any disclaimer, the term of this patent is extended or adjusted under 35 U.S.C. 154(b) by 23 days.

(21) Appl. No.: 15/943,026

(22) Filed: Apr. 2, 2018

(65) Prior Publication Data

US 2018/0290418 A1 Oct. 11, 2018

Related U.S. Application Data

(60) Provisional application No. 62/481,748, filed on Apr. 5, 2017.

(51) Int. Cl.
*B32B 3/04* (2006.01)
*B32B 5/02* (2006.01)
(Continued)

(52) U.S. Cl.
CPC .............. *B32B 3/04* (2013.01); *B29C 43/18* (2013.01); *B32B 5/02* (2013.01); *B32B 7/08* (2013.01); *B32B 7/12* (2013.01); *B32B 21/14* (2013.01); *B29C 2043/189* (2013.01); *B29K 2105/256* (2013.01); *B29K 2711/14* (2013.01);
(Continued)

(58) Field of Classification Search
CPC .... B32B 3/04; B32B 7/12; B32B 7/08; B32B 5/02; B32B 21/14; B32B 37/18; B32B 2255/26; B32B 2605/003; B32B 2317/16; B32B 38/0012; B32B 37/1284;
(Continued)

(56) References Cited

U.S. PATENT DOCUMENTS

2003/0105220 A1* 6/2003 Gupta ................ C08G 18/3234
524/589
2005/0208263 A1* 9/2005 Wilkens ............ B29C 45/14336
428/116
(Continued)

FOREIGN PATENT DOCUMENTS

EP 1319503 A1 * 6/2003 ............... B32B 5/22
WO WO-2013139361 A1 * 9/2013 ............... B32B 5/20

*Primary Examiner* — Michael N Orlando
*Assistant Examiner* — Christopher W Raimund
(74) *Attorney, Agent, or Firm* — Quinn IP Law (57) ABSTRACT

A panel assembly includes a multilayer load bearing panel configured to enclose an opening to an interior compartment by positioning the panel in the opening. The panel has opposing first and second appearance layers and is reversible in the opening between first and second positions. In the first position, the first appearance layer is outwardly facing in the opening and the second appearance layer faces inwardly to the compartment. In the second position, the second appearance layer is outwardly facing in the opening and the first appearance layer faces inwardly to the compartment. One of the appearance layers is made of a protective polymeric coating such as a thermosetting polyurethane-based coating or thermoset polyurea coating. The other appearance layer is made of one of a laminate structure which can include a wood veneer, a textile, or a carpeting material. A method for making the multilayer panel is provided.

11 Claims, 7 Drawing Sheets

(51) Int. Cl.
- *B32B 7/08* (2019.01)
- *B32B 7/12* (2006.01)
- *B29C 43/18* (2006.01)
- *B32B 21/14* (2006.01)
- *B29K 105/00* (2006.01)
- *B32B 37/12* (2006.01)
- *B32B 37/18* (2006.01)
- *B32B 38/00* (2006.01)
- *B29K 711/14* (2006.01)
- *B29L 31/30* (2006.01)

(52) U.S. Cl.
CPC ... *B29L 2031/3041* (2013.01); *B32B 37/1284* (2013.01); *B32B 37/18* (2013.01); *B32B 38/0012* (2013.01); *B32B 2255/26* (2013.01); *B32B 2317/16* (2013.01); *B32B 2605/003* (2013.01)

(58) Field of Classification Search
CPC ............... B29C 43/18; B29C 2043/189; B29L 2031/3041; B29K 2105/256; B29K 2711/14

See application file for complete search history.

(56) References Cited

U.S. PATENT DOCUMENTS

| | | | |
|---|---|---|---|
| 2013/0136931 A1* | 5/2013 | James | B32B 29/02 428/423.1 |
| 2014/0145470 A1* | 5/2014 | Preisler | B62D 29/04 296/193.07 |
| 2015/0130220 A1* | 5/2015 | Preisler | B32B 7/12 296/193.07 |
| 2015/0343682 A1* | 12/2015 | Kring | B29C 43/02 156/245 |

* cited by examiner

FIG. 21

LOAD BEARING PANEL

CROSS-REFERENCE TO RELATED APPLICATIONS

This Application claims the benefit of U.S. Provisional Application 62/481,748 filed Apr. 5, 2017, which is hereby incorporated by reference in its entirety.

TECHNICAL FIELD

The present disclosure pertains to load bearing panels including a core interposed between opposing exterior layers, and in particular, where each of the exterior layers is an appearance layer such that the panel is reversible.

BACKGROUND

A panel can be used to enclose a structure which can define an opening or compartment which is to be covered by the panel. The panel may be configured as a load bearing panel to withstand a force or load imposed on the panel without failing and/or exceeding a maximum deflection. Load bearing panels are used in vehicles to enclose various structures. For example, door panels configured to withstand bending and deflection forces are used to enclose door structures. In another example, a floor panel may be positioned in a floor, trunk, storage, or cargo space of a vehicle to enclose an interior compartment used to enclose or store one or more vehicle components, such as a spare tire or vehicle jack, or other vehicle user items, such as luggage, tools, etc. A floor panel may be used in a vehicle including one or more retractable seats, where the floor panel is configured to cover the seat(s) when the seat(s) are fully retracted into a compartment defined by the floor structure of the vehicle. In this configuration, the panel should be configured to withstand loading and deflection forces imposed on the panel when the seats are in the retracted position, which may include withstanding a minimum knee loading requirement. The floor panel should be configured to withstand bending and deflection forces and loads imposed by items which may be place on the floor panel, which may include vehicle users standing, sitting or kneeling on the floor panel, or items placed on the exposed surface of the floor panel, which can include personal items of the vehicle user such as luggage, sporting goods, groceries, furniture, etc., and can further include industrial items such as tools and equipment. Further, the floor panel should be configured to provide an aesthetically pleasing appearance to the vehicle user while being resistant to wear and tear during various types of use and loading with various items.

SUMMARY

A panel assembly including a multilayer load bearing panel and a method for making the multilayer panel are provided herein. A panel system is provided, including the multilayer panel configured to enclose an opening of an interior compartment by positioning the panel in the opening. The multilayer panel includes a cellular core layer interposed between a first appearance layer forming a first side of the panel, and a second appearance layer forming a second side of the panel, such that the panel is reversible, and can be selectively positioned by a user in the opening such that a selected one of the first and second appearance layers is outwardly facing to provide the exterior surface. By way of example, the reversible load bearing panel can be positioned in the opening in a first position such that the first appearance layer and first side of the panel is exterior to and outwardly facing from the opening and interior compartment being enclosed by the panel, and thus visible to a user. In this first position, the second appearance layer and second side of the panel is interior to and inwardly facing to the opening and interior compartment being enclosed by the panel, and thus not visible to the user. The reversible load bearing panel can be reversed to a second position to enclose the opening, where the panel in the second position is positioned in the opening such that the second appearance layer and second side of the panel is exterior to and outwardly facing from the opening and interior compartment being enclosed by the panel, and thus visible to a user. In this second position, the first appearance layer and first side of the panel is interior to and inwardly facing to the opening and interior compartment being enclosed by the panel, and thus not visible to the user. At least one of the first and second appearance layers is made of a coating layer formed of a polymeric coating material such as a thermosetting polyurethane and a thermoset polyurea. In one example, the first appearance layer includes at least one of a laminate structure, a textile material, carpeting, and/or a protective coating layer, and the second appearance layer is formed of the protective coating layer. In one example, the first appearance layer is a wood laminate structure, which can include a natural wood veneer.

In an illustrative example, the panel is configured as a floor panel to enclose an opening in a vehicle, such as an opening in a load floor or wall of a cargo area of a vehicle. At least one interior compartment may be accessible through the opening, such that with the floor panel positioned in the opening, the floor panel encloses the interior compartment away from an exterior compartment of the vehicle, where the exterior compartment can be, for example, the cargo area and/or passenger area of the vehicle. The panel has opposing first and second sides and is reversible such that either of the first and the second sides can be positioned as the exterior and outwardly facing side when the panel is installed in the opening, as selected by the vehicle user. In one example, the first side is made of one of a laminate material and a textile material, which may be decorative and/or configured to coordinate with and/or correspond to the materials forming other appearance surfaces of the vehicle, and the second side is made of the protective polymer coating to provide an appearance layer which is a polymeric protective layer resistant to abrasion, scratching, denting, impact, staining, chemical attack and deterioration from ultraviolet exposure, etc. In one example, the first side is made of a laminate material including a wood veneer such that the appearance layer has a wood grain finish. In another example, the first side is made of a textile material such as a carpet material, such that the appearance layer has a carpeted appearance. The second side is made of a protective coating such as a thermoset polyurethane-based material or thermoset polyurea coating. As such, the reversible panel disclosed herein is advantaged by providing a vehicle user with the choice of selectively positioning the first or second side as the exterior, outwardly facing side of the floor panel, depending upon the intended use of the panel by the vehicle user.

For example, the panel may be positioned in the vehicle floor with the first decorative side exposed such that the panel appearance is coordinated with and/or matches other appearance surfaces of the vehicle, when using the cargo area in a manner which does not anticipate uses which may scratch, abrade, or otherwise be detrimental to the decorative first appearance layer. The panel may be selectively reversed, e.g., repositioned in the vehicle floor by the vehicle user with the second protective side exposed, when the cargo area is used in a manner which requires a protective appearance surface which is resistant to scratching, impact, chemical attack, etc., for example, when storing or transporting heavy or abrasive items such as tools, equipment, gardening supplies, building supplies, chemicals, paint, etc. The multilayer panel disclosed herein includes a core member made of a lightweight material, to provide a lightweight panel which can be readily manipulated by a vehicle user to reposition the panel, e.g., reverse the panel to change the side of the panel which is outwardly facing, in the opening.

The panel can be configured to include one or more decorative and/or functional features. For example, the panel can include at least one of a textured surface finish, a ridge, and/or a rib formed in at least one of the first and second appearance layers. The panel can include one or more trim elements attached to at least one of the first and second appearance layers, such as rails, spears, buttons, etc., where the trim element protrudes outwardly from the appearance layer it is attached to, for example, to provide spacing between an object positioned on the protruding trim elements on the panel and the appearance layer. In one example, a sealant layer can be applied to the appearance layer, and a decorative element such as a decal, painted element, etc. can be positioned between the appearance layer and sealant layer. A closure trim element, such as a bezel element, can be included to enclose and/or encapsulate a perimeter edge of the cellular core layer and/or the perimeter edge of the panel. In one example, the panel assembly can include a first panel and a second panel, where the first and second panel are attached by a living hinge such that the interior compartment is accessible by rotating one of the first and second panels relative to the hinge when the panel assembly is in either of the first and second reversible positions.

A method of making the panel assembly includes forming the cellular core layer as a compression molded core member. In one example, the first appearance layer is bonded to the core member during the compression molding process. In another example, the first appearance layer is bonded to the core member after compression molding of the core member. The second appearance layer is formed by applying the protective polymeric coating to the molded core member. In one example, the polymeric coating is sprayed on to the core layer as a two-component spray which activates to form the thermoset coating material of the second appearance layer. One or more trim elements can be applied to the panel to form a panel assembly. In one example, the panel assembly includes first and second panels which are joined by at least one hinge, which may be configured as a living hinge.

The above noted and other features and advantages of the present disclosure are readily apparent from the following detailed description when taken in connection with the accompanying drawings.

DETAILED DESCRIPTION

Figure 1:
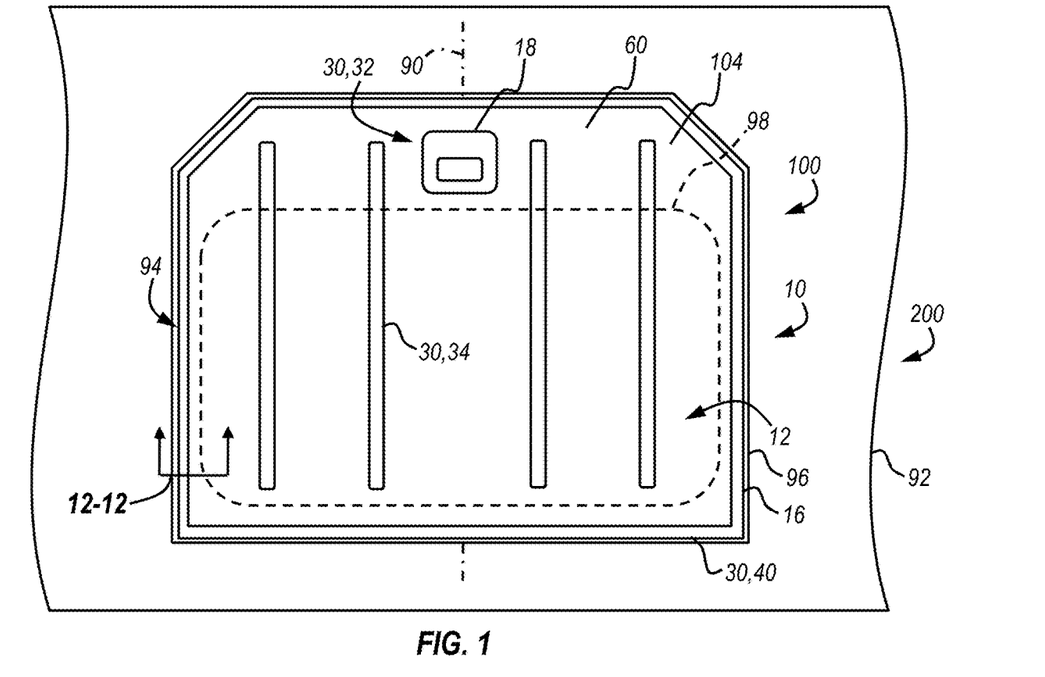
FIG. 1 is a schematic top view of a panel system, showing a first side of a panel assembly including a load bearing panel in a first installed position enclosing an opening and a compartment, with the first side including a first appearance layer facing outwardly from the opening.
Figure 2:
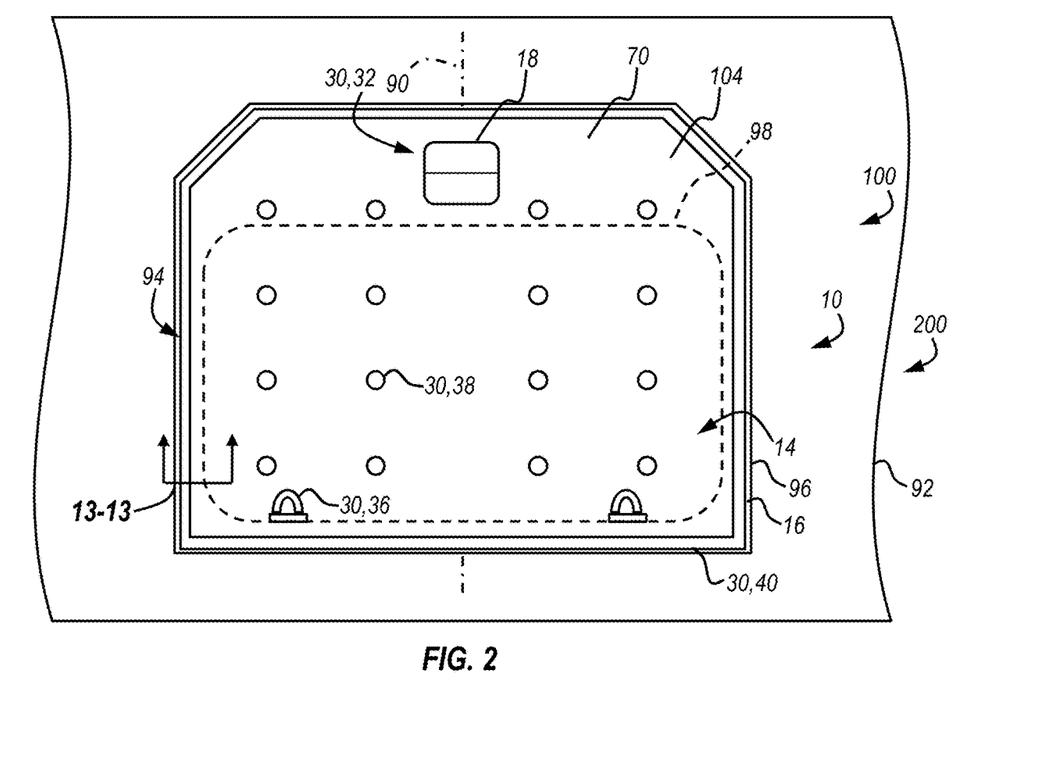
FIG. 2 is a schematic top view of the panel system of FIG. 1, showing the panel assembly reversed in the opening to show a second side of the panel assembly in a second installed position enclosing the opening and the compartment, with the second side including a second appearance layer facing outwardly from the opening.

A panel assembly 100 including a multilayer load bearing panel 10 and a method for making the multilayer panel 10 and panel assembly 100 are provided herein. Referring to the drawings wherein like reference numbers represent like components throughout the several figures, the elements shown in FIGS. 1-21 are not necessarily to scale or proportion. Accordingly, the particular dimensions and applications provided in the drawings presented herein are not to be considered limiting. The panel assembly 100 can be used in a panel system 200 as shown in FIGS. 1 and 2, to enclose one or more openings 96 defined by a support structure 92. The panel system 200 can include one or more interior compartments 98 which are accessible via the opening 96, such that when the panel assembly 100 is installed in the opening 96, the panel assembly 100 encloses the opening 96 and the interior compartment 98.

Figure 12:
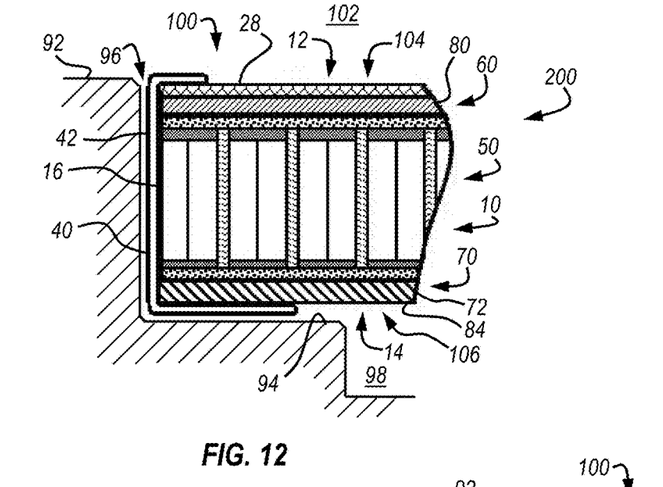
FIG. 12 is a schematic cross-sectional view of section 12-12 of the panel assembly of FIG. 1, including the panel and a closure trim element, showing the panel assembly installed in the opening with the first side and first appearance surface facing outwardly from the opening and enclosing the compartment.
Figure 13:
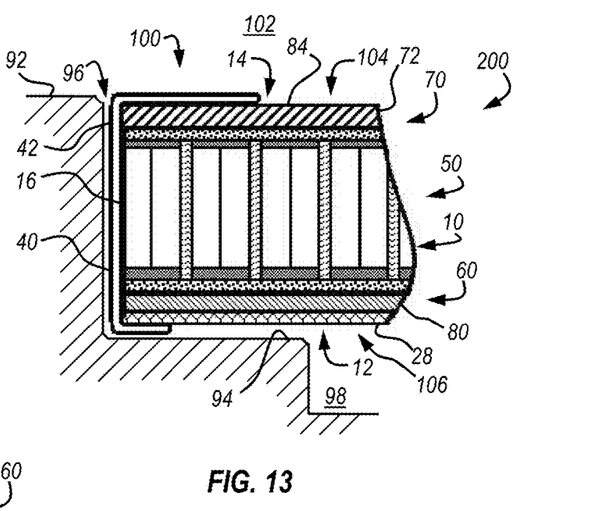
FIG. 13 is a schematic cross-sectional view of section 13-13 of the panel assembly of FIG. 2, including the panel and a closure trim element, showing the panel assembly installed in the opening with the second side and second appearance surface facing outwardly from the opening and enclosing the compartment.

Referring to FIGS. 1-2 and 12-13, shown is a panel assembly 100 configured, in a non-limiting example, for use in a panel system 200 defined by a vehicle, where the support structure 92 is defined by one of a load floor or wall of the vehicle. In one example, the support structure 92 is the load floor 92 of the vehicle including an interior compartment 98 which is accessible via an opening 96 in the load floor 92. The interior compartment 98 can be configured, for example, for storage of a spare tire for the vehicle, luggage, a stowed seat of the vehicle, etc. The floor panel assembly 100 is configured to enclose the opening 96 in the vehicle load floor 92, by having a contoured perimeter edge 16 which is configured to correspond to the opening 96. The panel assembly 100 and panel 10 has a first side 12 including a first appearance layer 60, and a second side 14 including a second appearance layer 70. The first and second sides 12, 14 are opposing, such that the panel assembly 100 is reversible, that is, either of the first and the second sides 12, 14 can be positioned as the exterior and outwardly facing side when the panel assembly 100 is installed in the opening 96, as selected by the user. In the example shown in FIGS. 1 and 2, the contoured edge 16 of the panel assembly 100 is symmetrical about an axis 90 such that the panel assembly 100 is reversible in the opening 96. In a first installed position shown in FIGS. 1 and 2, the load bearing panel assembly 100 is positioned in the opening 96 to enclose the opening 96 and the interior compartment 98, such that, in the first installed position, the first side 12 of the panel assembly 100 is outwardly facing relative to the interior compartment 98 being enclosed by the panel assembly 100 to define the exterior surface 104 of the panel assembly 100 which is visible to a vehicle user in the first installed position, while the opposing second side 14 is inwardly facing to the compartment 98 enclosed by the panel assembly 100 such that the second side 14 defines, in the first installed position, an interior surface 106 of the panel assembly 100, which as installed is not visible to a vehicle user. FIGS. 2 and 13 show the panel assembly 100 reversed and positioned in the opening 96 in a second installed position to enclose the opening 96 and the compartment 98. In the second installed position, the second side 14 of the panel assembly 100 is outwardly facing relative to the compartment 98 to define the exterior surface of the panel assembly 100 which is visible to a vehicle user in the second installed position, which the opposing first side 12 is interior to the compartment 98 and not visible to a vehicle user.

In the example shown in FIGS. 1 and 2, the first side 12 of the panel 10, which may also be referred to herein as a panel member, includes a first appearance layer 60 made of one of a laminate material 80 (see FIGS. 3 and 7) and a textile material 68 (see FIGS. 3 and 15), such that the first side 12 can be decorative and/or configured to coordinate with and/or correspond with other appearance materials forming appearance surfaces of the vehicle. In the example shown in FIG. 1, the first appearance layer 60 is made of a laminate material 80 including a natural wood layer 62, as further described herein. In the example shown in FIGS. 3 and 15, the first appearance layer 60 is made of a textile material 68, which in non-limiting examples can be a carpet material, an organic material such as leather, a scrim material, or other textile material. The second side 14 of the panel 10 includes a second appearance layer 70 made of a polymer coating material 72 which is applied to the panel 10 to form a coating surface 84 which is resistant to abrasion, scratching, chipping, denting, impact, staining, chemical attack and ultraviolet exposure, etc. The coating material 72 forming a coating surface 84 of the second appearance layer 70 is made of a protective polymer coating such as a polyurethane-based or polyurea coating, as further described herein. The coating material 72 can be a thermoset polymer material, such as a thermosetting polyurethane resin, or a thermoset elastomer, which can be formed using a two-component system, for example, by spraying the components onto the second side 14 of the panel to form a thermoset coating material 72. The coating material 72 may be colored to coordinate with other appearance surfaces in the vehicle, and the coating surface 84 may be textured, patterned, applied in layers and/or be variable in height for appearance and/or for functionality, for example, as a slip resistant surface. The reversible panel assembly 100 disclosed herein is advantaged by providing a vehicle user with the choice of selectively positioning either the first decorative side 12, or the second protective side 14 as the exterior, outwardly facing side of the floor panel, depending upon the intended use of the panel assembly 100 by the vehicle user.

For example, the panel assembly 100 may be positioned in the vehicle floor 92 with the first decorative side 12 outwardly facing and exposed such that the panel appearance layer 60 is coordinated with and/or matches other appearance surfaces of the vehicle, when using the cargo area in a manner which does not anticipate uses which may scratch, abrade, or otherwise be detrimental to the surface finish of the decorative first appearance layer 60. The panel assembly 100 may be selectively reversed, e.g., repositioned in the vehicle floor 92 by the vehicle user with the second protective side 14 outwardly facing and exposed, when using the cargo area in a manner which requires a protective layer 70 which is resistant to scratching, impact, chemical attack, etc., for example, when storing or transporting heavy or abrasive items such as tools, equipment, gardening supplies, building supplies, chemicals, paint, etc. in the vehicle, and which is readily cleanable and water repellant. The multilayer panel 10 disclosed herein includes a core member 50 (see FIGS. 4 and 6) made of lightweight materials, to provide a lightweight panel 10 which can be readily manipulated by a vehicle user to reposition the panel assembly 100 in the opening 96, e.g., reverse the panel to change the side 12, 14 of the panel 10 which is outwardly facing, according to the needs or preference of the vehicle user.

Figure 3:
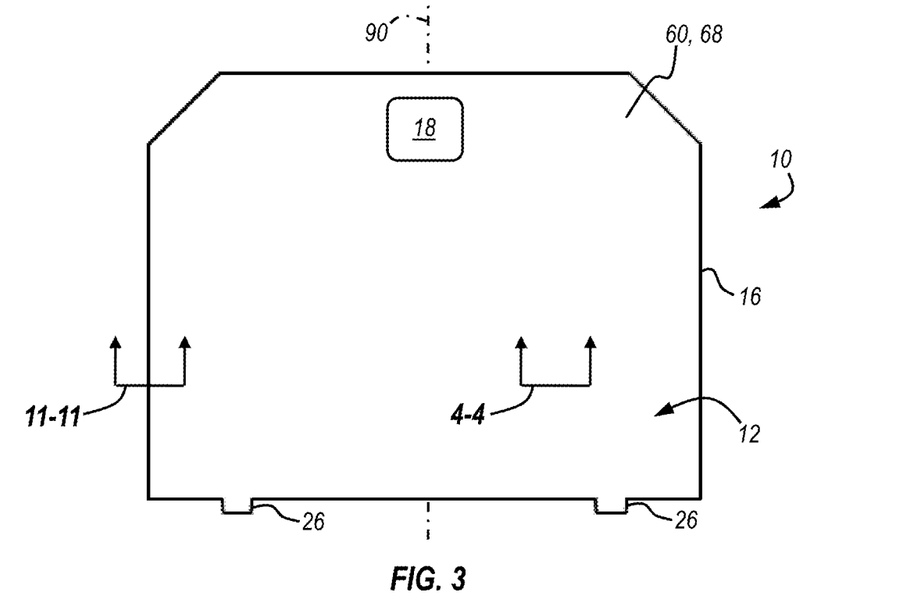
FIG. 3 is a schematic plan view of the first side of the load bearing panel of FIG. 1.

The panel assembly 100 can include one or more trim elements 30. In a non-limiting example shown in FIGS. 1 and 2, trim elements 30 can include a handle 32, rails 34, buttons 38, hold down attachments 36, and closure trim 40. In the illustrative example, the handle 32 is a two-sided handle fitted into an aperture 18 formed in the panel 10 such that the handle 32 is accessible from each of the first and second sides 12, 14 by a user, for ease of moving the panel assembly 100 in the opening 96, for example, when reversing the panel assembly 100 to change the exterior surface 104 of the panel assembly 100 between the first and second sides 12, 14. Rails 34, which may also be referred to as runners or spears, protrude outwardly from the surface of the first side 12 to protect the surface finish of side 12 from items placed on load panel 10 in use. The rails 34 can be made of a metal-based material such as aluminum, steel, or stainless steel, or of a polymer-based material such as a thermoset or thermoplastic material or reinforced composite polymer material, or a combination of these, and may be surface treated by coating, coloring, brushing, polishing or otherwise texturing to coordinate and/or correspond to other trim elements 30 of the panel assembly 100 and/or other trim elements within the vehicle. In the illustrative example shown in FIG. 1, the rails 34, handle 32 and closure trim 40 are made of stainless steel with a brushed surface finish. The closure trim 40 in the example shown in FIGS. 1, 2, 12 and 13 is formed as a metal bezel 42 which encapsulates the perimeter edge 16 of the panel 10. In the illustrative example shown in FIG. 2, the buttons 38 are made of a polymer material such as acetyl, colored to match the appearance layer 70 of the second side 14. The buttons 30 also function as retainers to receive studs protruding through the panel 10 from the interior facing side of the rails 34, to retain the rails 34 to the panel 10. The panel 10 can include one or more extensions or tabs 26, as shown in FIG. 3, which can correspond to recesses in the opening 96 or vehicle floor 92 to facilitate orientation and/or retention of the panel assembly 100 in the opening 96.

Figure 4:
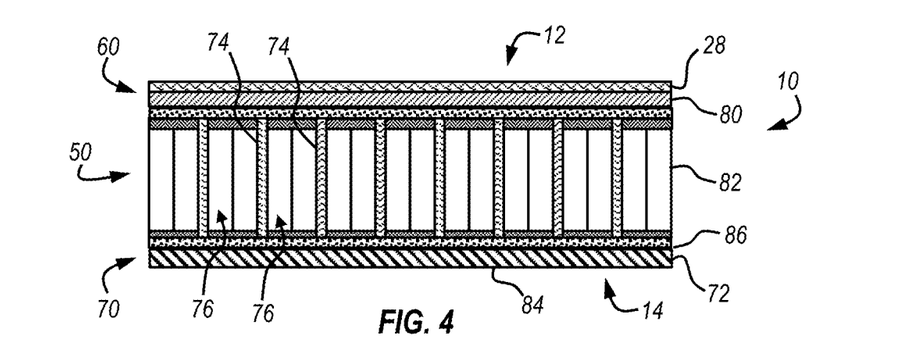
FIG. 4 is a schematic cross-sectional view of section 4-4 of FIG. 3, showing multiple layers of the panel of FIG. 3 including a core member, the first appearance layer, and the second appearance layer.

Referring now to FIGS. 3-11, example methods of making the load bearing panel 10 are illustrated. As shown in FIG. 4, the load bearing panel 10 is a multilayer panel including a core member 50 interposed between a first appearance layer 60 and a second appearance layer 70. In the example shown, the first appearance layer 60 forms the exterior surface visible and outwardly facing from the first side 12 of the panel 10, and the second appearance layer 70 forms the exterior surface visible and outwardly facing from the second side 14 of the reversible panel 10.

The core member 50 is formed by compression molding and includes a core layer 82 which is interposed between a first cover layer 52 and a second cover layer 54. The core layer 82, in the example shown in FIG. 4 and FIGS. 6-11 is a cellular material made from a cellulose-based material, such as wood fiber, cardboard or paper. The cellular layer 82 includes a plurality of cells 76 each defining a hollow cavity 76 in the cellular layer 82, similar to a honeycomb structure, such that the cellular layer 82 provides a lightweight layer reducing the overall weight of the panel 10, thus making the panel assembly 100 readily movable, reversible, and repositionable in the vehicle opening 92 between the first and second installed positions shown in FIGS. 1-2, and/or readily removable from the vehicle, for example, for cleaning. In one example, the cellular layer 82 is received in a collapsed form and expanded to the honeycomb structure shown in FIG. 6, prior to being layered between first and second cover layers 52 and 54. The first and second cover layers 52, 54 are made of a polymer material suitable for compression molding, and may include a filler material to increase the strength of the core member 50. In one example, each of the cover layers 52, 54 is formed from a fiber reinforced woven thermoplastic material, such as a chopped strand mat. In a non-limiting example, the cover layers 52, 54 are each formed from a chopped strand mat including a fiberglass filler and having a mat weight in the range of 200 to 500 grams per square meter (gsm). In one example, the cover layers 52, 54 are formed from a chopped strand mat made of polyethylene terephthalate (PET) E Glass fibers in a polyester binder, with a fiber length of 50 mm (2") and a mat weight of 450 gsm (1.475 oz./ft.$^2$). The example is non-limiting, and it would be understood that other types of chopped strand mat or thermoplastic materials may be used to form each of the first and second cover layers 52, 54.

Figure 6:
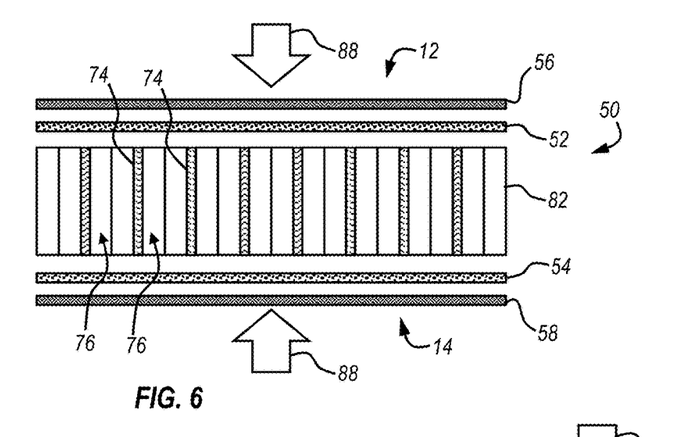
FIG. 6 is a schematic cross-sectional view of an example of the core member, with the multiple layers of the core member separated and showing a method of forming the core member.

The core member 50 is formed by layering the cellular core layer 82 between the first and second cover layers 52, 54, as shown in FIG. 6, then applying a first adhesive layer 56 to the outwardly facing surface of the first cover layer 52 and applying a second adhesive layer 58 to the outwardly facing surface of the second cover layer 54. In a non-limiting example, the first and second adhesive layers 56, 58 may be applied by spraying a two-part adhesive on the respective first and second cover layers 52, 54, such that the two-part adhesive becomes activated when sprayed on the cover layers 52, 54. In one example, the two-part adhesive can be a methylene diphenyl diisocyanate (MDI)-based polyurethane having a first adhesive part which is an isocyanate-based material and a second adhesive part which is a resin which, when combined by spraying on to the first and second cover layers 52, 54, activate to form the thermoset urethane adhesive layers 56, 58. After spraying the two-part adhesive on each of the first and second cover layers 52, 54 to form the first and second adhesive layers 56, 58, the layered structure, as illustrated by FIG. 6, is placed in a heated mold cavity of a compression mold (not shown), and heated and compressed to form the core member 50. The mold cavity and the compression mold are configured such that the core member 50 is trimmed during forming, typically during closing of the mold, to the shape required to form the panel 10. In the example shown in FIG. 3, the shape of the core member 50 is defined by the perimeter edge 16, which may also be referred to herein as the contoured edge or trim edge of the panel 10. The aperture 18 can be formed by trimming in the compression mold, or by a separate cutting operation.

Figure 11:
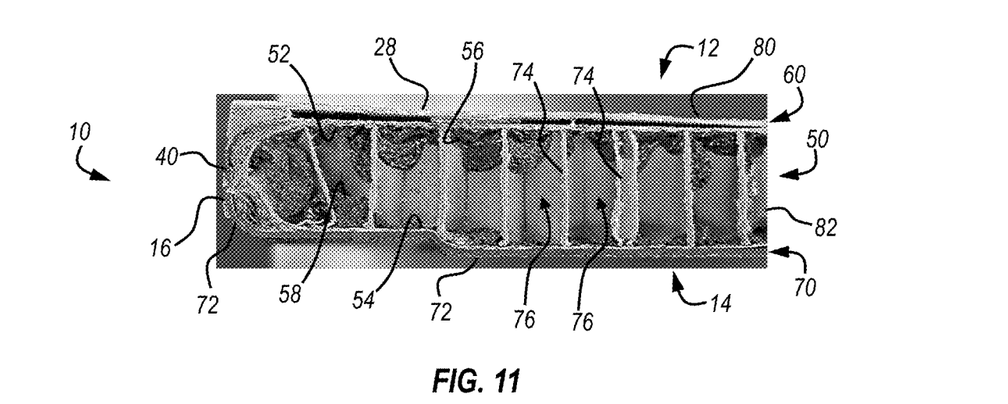
FIG. 11 is a photographic image of a cross-section of section 11-11 of the panel of FIG. 3.

During compression molding, the layered structure shown in FIG. 6 is placed into a mold which is heated in the range of 230-300 degrees Fahrenheit (deg. F), where heating of the layered structure shown in FIG. 6 causes migration of the first adhesive layer 56 in and through the first cover layer 52 and the cellular layer 82, and migration of the second adhesive layer 58 in and through the second cover layer 54 and the cellular layer 82, to bond the first and second cover layers 52, 54 to the cellular layer 82 and to cure the thermoset material in the adhesive layers 56, 58, thus forming the core member 50 shown in FIG. 7. Referring to FIG. 11, shown is a photographic image of a cross-section of a panel 10, illustrating migration of the first and second adhesive layers 56, 58 into the cover layers 52, 54 and into cells 74 and cavities 76 of the cellular layer 82. After molding, the cover layers 52, 54 and the adhesive layers 56, 58 contribute to the load bearing strength of the core member 50. In an illustrative example, the panel 10 including the core member 50 as disclosed herein is configured as a load bearing panel to withstand a bending and deflection force imposed by items which are placed on the panel assembly 100 so as to exert a force on the panel 10 which is general normal to the first and second sides 12, 14 of the panel 10. For example, a vehicle user standing, sitting or kneeling on the panel 10 of the panel assembly 100 imposes a load generally referred to as a knee load, which must be withstood by the multilayer load bearing panel 10. In one example, the load bearing panel 10 can withstand a minimum knee load of at least 250 pounds applied with a 75 mm disk load as a point load to the central portion of the panel 10 in a direction of force normal to the panel sides 12, 14, such that deflection of the panel 10 in the direction the point load is applied does not exceed 10 mm during loading, and such that the permanent deflection of the panel 10 after loading to 250 pounds knee load does not exceed 5 mm.

Figure 5:
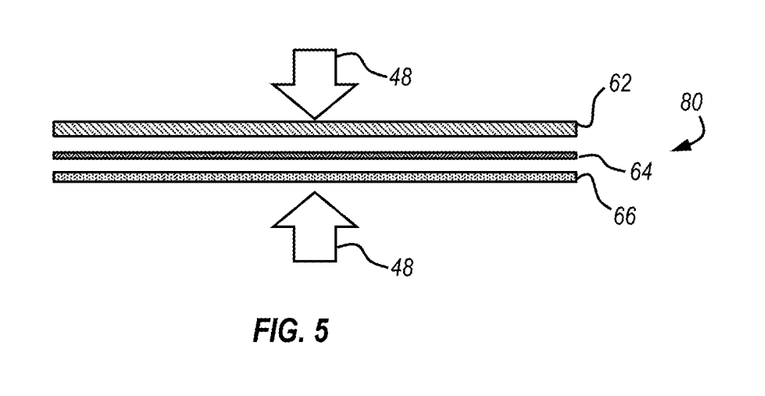
FIG. 5 is a schematic cross-sectional view of an example of the first appearance layer, with the multiple layers of the first appearance layer separated and showing a method of forming the first appearance layer.

In the example shown in FIGS. 1, 4-5 and 7-8, the first appearance layer 60 includes a laminate structure 80 which includes a decorative layer 62, a laminate adhesive layer 64, and a substrate layer 66, which may also be referred to herein as a barrier layer 66. In an illustrative example, the laminate layer 62 is a natural wood layer, which may also be referred to herein as a wood veneer. The natural wood layer may be a thin layer of any type of wood, including by way of non-limiting example, maple, oak, cherry, pine, bamboo, hickory, zebrano, etc. wood. In one example, the wood veneer laminate layer 62 is approximately 0.50 mm (0.02 inches) in thickness. The example is non-limiting, and it would be understood that the laminate layer 62 may be made from other decorative materials including polymer-based decorative materials, such as a vinyl or other synthetic material, which may be colored, blended, molded, or textured to provide a decorative laminate layer 62. In one example, the laminate layer 62 may be a polymer-based material or a metal-based material configured to simulate wood, including exhibiting a wood grain pattern and/or wood finish. As illustrated in FIG. 5, the laminate structure 80 is formed by laminating the decorative layer 62 to a substrate layer 66, using a laminate adhesive 64. In an illustrative example, the laminate adhesive 64 is a pressure sensitive adhesive (PSA), which may be applied during the laminating process in a liquid form or as an adhesive film to bond the decorative layer 62 to the substrate layer 66. As illustrated by the arrows 48 shown in FIG. 5, pressure is applied during laminating and bonding of the decorative layer 62 to the substrate layer 66, for example, by laminating rollers or a laminating press, to form the laminate structure 80. The substrate layer 66 can be made of a polymer-based, fiberglass-based, or metal-based material configured to provide support to the decorative layer 62 and/or strength to the laminate structure 80. By way of example, the substrate layer 66 can be made from a polyester backing material, a fiberglass reinforced polymer, and/or an aluminum-based material. The substrate layer 66 can be configured to function as a barrier layer and/or isolation layer to prevent migration to, absorption by, and/or staining of adhesive, adhesive by-products, and/or urethane-based material by the decorative layer 62 from the adhesive layer 56 and/or the bonding adhesive 46 resultant from bonding the laminate structure 80 to the core member 50.

Figure 7:
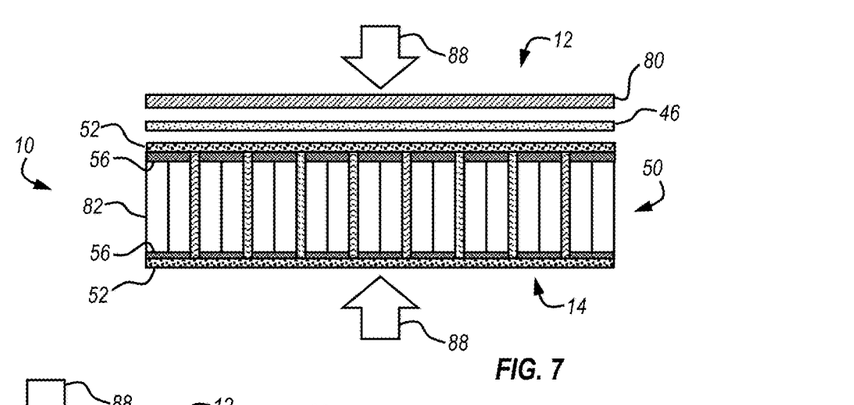
FIG. 7 is a schematic cross-sectional view of an example step of a method for forming the panel, showing compression molding of a stack of layers including the first appearance layer and the core member.

In one example, the laminate structure 80 is bonded to the core member 50 as shown in FIG. 7, by applying a layer of bonding adhesive 46 between the core member 50 and the substrate layer 66 of the laminate structure 80, and applying pressure to the sandwiched layers 50, 46, 80, as illustrated by the arrows 88 shown in FIG. 7. In an illustrative example, the bonding adhesive 46 can be a moisture curing adhesive such as a polyurethane reactive (PUR) adhesive, which can be applied during the bonding process as a liquid or in hot melt form. In one example, the bonding adhesive 46 is first applied to the substrate layer 66 of the laminate structure 80 using a roll coater. Secondly, the adhesive coated laminate structure 80 is then positioned with the substrate layer 66 facing the core member 50, with the bonding adhesive 46 in contact with the surface of the core member 50, and pressure applied to the sandwiched layers 50, 46, 80, as illustrated by the arrows 88 shown in FIG. 7, for example, by a bonding press, where the pressure of the bonding press causes the bonding adhesive 46 to wet out on the surfaces of the laminate structure 80 and the core member 50 being bonded. The bonding adhesive 46 is cured, bonding the laminate structure 80 to the core member 50 to provide the multilayer structure shown in FIG. 9. In one example, the laminate structure 80 is trimmed to a shape and size corresponding to the core member 50, e.g., to the shape and size defined by the contoured edge 16 of the core member 50, prior to bonding the laminate structure 80 to the core member 50. In another example, the laminate structure 80 is trimmed to match the shape and size of the perimeter edge of the core member 50 after bonding the laminate structure 80 to the core member 50, for example, by trimming in a press, or cutting away a trim portion (not shown) using a router cutter or comparable cutting device.

Figure 8:
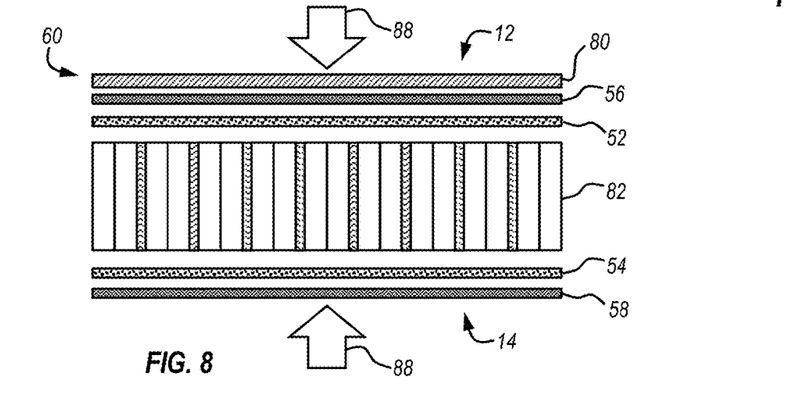
FIG. 8 is a schematic cross-sectional view of an example step of another method for forming the panel, showing compression molding of a stack of layers including the first appearance layer and multiple separated layers of the core member.

Referring to FIG. 8, in another example method the core member 50 is formed concurrently with bonding the laminate structure 80 to the core member, such that the bonding adhesive layer 46 is not required. As previously described herein, the cellular core layer 82 is layered between the first and second cover layers 52, 54, as shown in FIG. 8, a first adhesive layer 56 is applied to the outwardly facing surface of the first cover layer 52, and a second adhesive layer 58 is applied to the outwardly facing surface of the second cover layer 54. The first and second adhesive layers 56, 58 may be applied by spraying a two-part adhesive on the respective first and second cover layers 52, 54, such that the two-part adhesive becomes activated when sprayed on the cover layers 52, 54. In one example, the two-part adhesive can be a methylene diphenyl diisocyanate (MDI)-based polyurethane having a first adhesive part which is an isocyanate-based material and a second adhesive part which is a resin which, when combined by spraying on to the first and second cover layers 52, 54, activate to from the polyurethane adhesive layers 56, 58. After spraying the two-part adhesive on each of the first and second cover layers 52, 54 to form the first and second adhesive layers 56, 58, the layered structure, as illustrated by FIG. 8, is placed in a heated mold cavity of a compression mold (not shown). The laminate structure 80 is placed into the mold cavity as shown in FIG. 8, and the sandwiched layers are heated and compressed, as indicated by the arrows 88 in FIG. 8, in the compression mold to concurrently form the core member 50 and bond the laminate structure 80 to the core member 50, to form the multilayer structure shown in FIG. 9. In this example, the activated adhesive of the first adhesive layer 56 bonds to the cover layer 52, to the cellular layer 82 and to the substrate layer 66 of the laminate structure 80 to bond the cover layer 52 to the cellular layer 82 and to the laminate structure 80. In one example, the mold cavity is vented during the compression molding cycle to release gases generated during curing of the adhesive layers 56, 58, to prevent formation of gas bubbles or voids between the laminate structure 80 and the core member 50, and/or to prevent blistering of the laminate structure 80. In one example, the laminate structure is trimmed to the shape and size of the panel 10 prior to insertion into the mold, the core member 50 is trimmed during forming in the mold cavity to the shape required to form the panel 10. In another example, the mold cavity and the compression mold are configured such that the laminate structure 80 and the core member 50 are trimmed to the shape required to form the panel 10 in the mold during the compression molding, typically during closing of the mold by a trim feature incorporated into the mold cavity. In another example, laminate structure 80 and core member 50 are bonded together and formed in the compression mold, and trimmed or cut to shape by a separate cutting operation.

Figure 9:
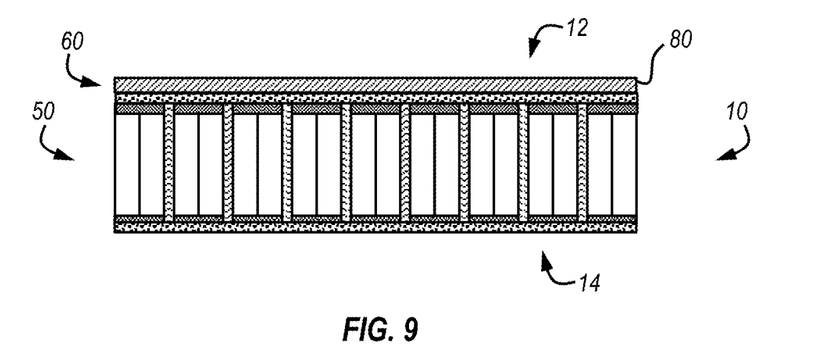
FIG. 9 is a schematic cross-sectional view of the partially formed panel, including the first appearance layer and core member, after compression molding as shown in FIG. 7 or FIG. 8.
Figure 10:
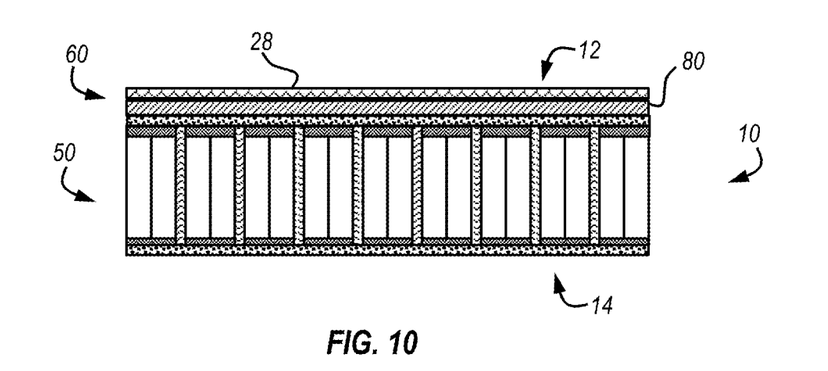
FIG. 10 is a schematic cross-sectional view of an example step of a method for forming the panel, showing application of a sealant layer to the first appearance layer of the partially formed panel of FIG. 9.

After bonding of the laminate structure 80 to the core member 50 to form the multilayer structure shown in FIG. 9, a sealant layer 28, as illustrated in FIG. 10, can be applied to the laminate structure 80 to seal and protect the decorative layer 62 and the first appearance layer 60, which in the non-limiting example shown in FIG. 1 includes genuine wood veneer. The sealant layer 28 is made from a high strength polymer-based material to resist scratching, chipping, denting, abrasion, staining, chemical attack, ultraviolet exposure, and wear of the first appearance layer 60 in use. The sealant layer 28 can be clear, e.g., transparent and substantially colorless, such that the decorative layer 62 is fully visible through the sealant layer 28. In another example, the sealant layer 28 can be colored, tinted or contain a filler material to modify the appearance and/or transparency of the decorative layer 62 and the first appearance layer 60. By way of example, the sealant layer 28 can be made of a urethane material which can be sprayed on in one or more layers to achieve a desired thickness. In one example, a urethane material is sprayed on in multiple layers to achieve a total thickness of the sealant layer 28 in the range of 0.5-0.7 mm thick, having a high gloss finish. Each layer of the urethane coating may be sanded or otherwise smoothed prior to application of a subsequent layer, to achieve the desired thickness and finish of the sealant layer 28. The sealant layer 28 can be applied to achieve a desired finish, such as a high gloss, semi-gloss, or matte finish. In another example, the sealant layer 28 can be formed by flow coating the sealant material on to the decorated layer 62 of the laminate structure 100, to achieve a high gloss finish. In this example, the thickness of the sealant layer 28 can be in the range of 0.05-0.20 mm. In another example, the multi-layer structure shown in FIG. 9 can be placed in a mold having a mold surface having a highly polished surface finish, such that a narrow gap is established between the decorative layer 62 and the highly polished mold surface, and the coating material forming the sealant layer 28 can be injected into the gap to form the sealant layer 28 having a high gloss finish.

Figure 20:
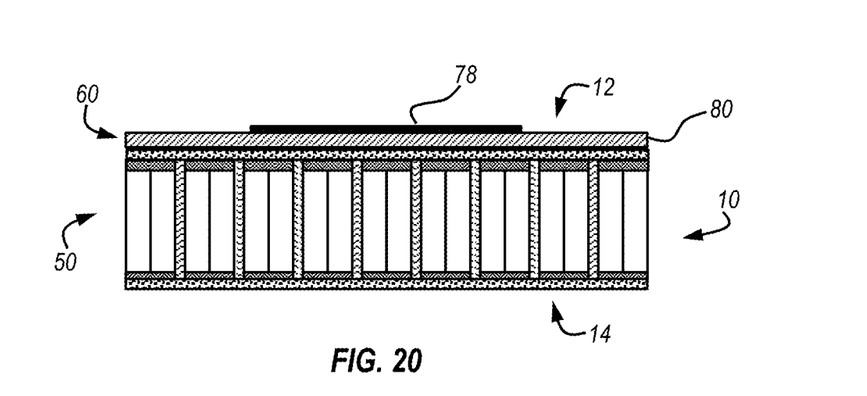
FIG. 20 is a schematic cross-sectional view of an example step of a method for forming the panel, showing application of a decorative layer to the first appearance layer of the partially formed panel of FIG. 9.
Figure 21:
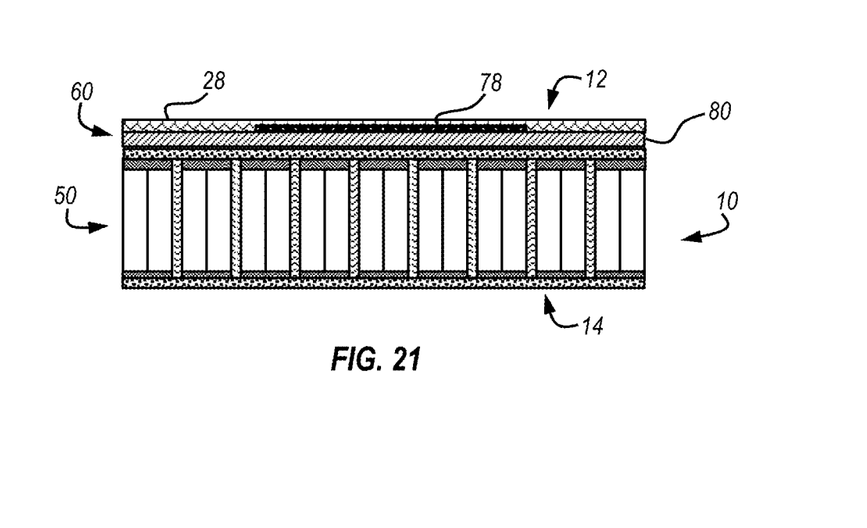
FIG. 21 is a schematic cross-sectional view of an example step of a method for forming the panel, showing application of a sealant layer to the first appearance layer of the partially formed panel of FIG. 20.

Referring to FIGS. 20 and 21, one or more decorative elements 78 can be applied to the decorative layer prior to applying the sealant layer 28. By way of non-limiting example, the decorative element 78 can include one or more of a stain, paint, decal, embossment, brand, etching, etc. which is applied to the decorative layer 62. By way of example, the decorative element 78 can be in the form and/or shape of a pattern, image, logo, etc. applied to the decorative layer 62. In the example shown in FIG. 21, the sealant layer 28 is applied over the decorative element 78 such that the decorative element 78 is encapsulated, e.g., covered by the sealant layer 28.

The example of a first appearance layer 60 which includes a laminate structure 80 is non-limiting, and it would be understood that laminate structures 80 and/or non-laminate materials 68 (see FIG. 15), can be used to form the first appearance layer 60. By way of non-limiting example, the first appearance layer 60 can be made of textiles including woven and non-woven materials, carpeting, scrim, organic materials such as leather, polymeric materials including thermoplastic and thermoset materials, and metal-based materials including, for example, stainless steel and aluminum. In one example shown in FIGS. 3 and 15, the first appearance layer 60 is made of a non-laminated material 68 which is a carpet material, which may be made of a thermoplastic olefin (TPO) material. As described for the laminated structure 80, the non-laminated material 68 can, depending on the type of material, be positioned in the compression mold and bonded to the core member 50 during compression molding of the core member 50, and/or be bonded to the core member 50 in a separate operation using a bonding adhesive 46 applied between the non-laminated material 68 and the core member 50. As described for the laminated structure 80, a sealant layer 28 can be applied to the non-laminated material 68 to increase resistant of the first appearance layer 60 to wear, abrasion, staining, etc.

Referring to FIGS. 4 and 11, the second appearance layer 70 is formed on the second side 14 of the panel 10 by applying a layer of a polymer coating material 72 to the second side 14 of the core member 50. The polymer coating 72 may also be referred to herein as a coating material 72. In an illustrative example, the coating material 72 is made of a protective flexible coating material such as a polyurethane-based material or a polyurea material to form a second appearance layer 70 and coating surface 84 which is resistant to abrasion, scratching, chipping, denting, impact, staining, chemical attack and ultraviolet exposure, etc. In one example, the polymer coating material 72 is applied directly to the core member 50. In another example, an adhesion promoter or bonding agent 86 is applied to the core member 50 prior to applying the polymer coating material 72, to increase the strength of the bond between the coating surface 84 formed of the polymer coating material 72 and the core member 50, which may be indicated, for example, in terms of peel strength. In another example, the core member 50 is cleaned or pretreated such that the surface of the core member 50 to which the coating material 72 is applied is free of dust, loose fibers, or other debris. The coating material 72 can include one or more filler materials. For example, the coating material 72 can include a colorant or pigment as a filler to color the coating material 72 to form a coating surface 84 having a color which coordinates with the color of other appearance surfaces in the vehicle, or having a color or pigmentation such that stains, dirt, etc. on the coating surface 84 are not as readily apparent or visible when the panel 10 is positioned in the opening 96 such that the second side 14 is visible as the exterior surface 104 of the panel 10 during use. The coating material 72 can include fillers, for example, to increase toughness, tensile strength, flexibility of the second appearance layer 70.

In an illustrative example, the coating material 72 is applied to second side 14 of the core member 50 by spraying the coating material 72 in one or more layers on to the core member 50 to form the second appearance layer 70 including the coating surface 84. In an illustrative example, the coating material 72 is made of a two-component fast set polyurea material, where the first component is an isocyanate material and the second component is a resin material, applied in a 1:1 ratio by volume using a two-part spray system, such that, when the two components are mixed during spraying and cure, a polyurea material is formed. In one example, the total thickness of the coating material 72 forming the coating surface 84 is in the range of 1.0-2.0 mm, or more preferably, in the range of 1.25-1.52 mm (0.050-0.060 inches). The second appearance layer 70 can be formed by selectively spraying the coating material 72 on the core member 50 to create a coating surface 84 that is variable in height and/or thickness, and/or which may have a textured or patterned appearance. For example, the coating surface 84 may be textured or patterned for appearance and/or for functionality, such as providing a slip resistant surface. The thickness of the coating surface 84 may be varied, for example, to create one or more ridges or ribs in the second appearance layer 70 to provide ventilation around and/or to trap dirt or water away from cargo or items placed on the second side 14 of the panel assembly 100 in use. The coating material 72 may be applied using spraying equipment which is robotically controlled, including robotically controlling the pattern, texture, and thickness of the coating material 72 forming the coating surface 84. A top finish coat can be applied to the coating surface 84 for example, to seal the second appearance layer 70 and/or to provide a colorfast finish. In one example, the top finish coat can be made of an aliphatic polyurethane/polyurea material. The coating surface 84 formed of coating material 72 provides an advantage by functioning as a sound deadening material and insulating layer of the panel 10, increasing noise, vibration and thermal insulating performance of the panel assembly 100.

After forming the load bearing panel 10 shown in FIGS. 3 and 4, one or more trim elements 30 can be assembled to the panel 10 to form the panel assembly 100. In one example, one or more of the trim elements 30, such as the handle 32, the attachments 36, and/or the closure trim 40 can be assembled to the panel 10 prior to applying the coating material 72. In this example, the trim elements 30 may be masked or otherwise shielded during spraying of the coating material 72, to protect the trim elements 30 from overspray. As shown in FIGS. 1 and 2, the trim elements 30 can include one or more rails or spears which can be installed on one or both of the first and second sides 12, 14 of the panel 10. In the example shown, the rails 34 are installed on the first appearance layer 60, e.g., on the first side 12 of the panel 10, and protrude from the surface of the first appearance layer 60, to provide an elevated surface on which to place cargo or other items positioned on the load bearing panel assembly 100 during use. As such, the rails 34 protect the first appearance layer 60 from abrasion, dents, scratches etc. by positioning items placed on the first side 12 of the panel 10 at a distance away from the first appearance layer 60. In an illustrative example, the rails 34 include studs (not shown) which protrude through the panel 10 and are retained to the panel 10 by fasteners 38 which are inserted through the panel 10 to receive and engage the studs of the rails 34. The fasteners 38 in the example shown are made of a polymeric material, which may be a thermoplastic material such as polyoxymethylene (POM), also known as acetal, polyacetal and polyformaldehyde. The fasteners 38 are designed, in the present example, in a button or disc shape such that the fasteners 38 also provide a decorative element to the second side 14 of the panel assembly 100.

Referring now to FIGS. 12-16, various non-limiting examples and methods to enclose the perimeter edge 16 of the panel 10 are shown. As shown in FIG. 12 and in the example shown in FIGS. 1, 2, 12 and 13, a closure trim element 40 is assembled to the perimeter edge 16 of the panel 10 such that the closure trim element 40 encapsulates the perimeter edge 16 including enclosing the cells 74 and cavities 76 of the cellular layer 82 at the perimeter edge 16. In a non-limiting example shown in FIGS. 12 and 13, the closure trim element is configured as a bezel trim 42 which is flanged to extend onto the first and second sides 12, 14 of the panel 10, and in contact with the first and second appearance surfaces 60, 70, to seal the bezel trim 42 to the panel 10, thus preventing ingression of contaminants such as fluids, dirt, etc., into the core layer via the perimeter edge 16. In a non-limiting example, the bezel trim 42 is made of a metal-based material, which may be pre-formed to conform to the contoured perimeter edge 16, and may include one or more pieces of bezel trim 42 which can be assembled to the panel 10 and/or joined to each other to enclosure the perimeter edge 16. The metal-based material may be selected to coordinate with other trim elements 30 on the panel assembly 100 and/or in the panel system 200 into which the panel assembly 100 is installed. In a non-limiting example, the panel system 200 can be configured as a vehicle. In a non-limiting example, the metal bezel trim 40 can be made of one of a steel-based material, which may be a stainless steel, an aluminum material, and/or another metal-based material such as a copper-based material, etc. and may be finished with a surface finish, plated, coated, or textured, e.g., polished, brushed, etc. to coordinate with other trim elements in the panel system 200. The metal bezel trim 40 can be coated with a protective coating, which may be a polymeric or metal oxide coating, plating, painting, and which may be resistant to scratching, denting, chipping, staining, abrasion, etc. In one example, the metal bezel trim 40 may be coated with a protective polyurethane coating. As shown in FIGS. 12 and 13, the panel assembly 100 is positioned in the opening 96 of the support structure 92, which in an illustrative example is a vehicle floor 92, to enclose the opening 96 and, in the example shown, an interior compartment 98, such that the interior compartment 98 is separated from an exterior compartment 102 by the panel assembly 100. In one example, the exterior compartment 98 is an interior area of a vehicle, such as a cargo area. In the example shown in FIG. 14, a support element 94 is formed in the support structure 92 and/or interior compartment 98 to receive and support the perimeter edge 16 of the panel assembly 100 in the installed position. As shown in the non-limiting example of FIGS. 12 and 13, the support element 94 can be configured as a step, lip and/or flange protruding inward from the perimeter of the opening, and recessed from the exterior surface of the vehicle floor 92, such that, with the panel assembly 100 positioned on the support element 94, the outwardly facing surface 104 of the panel assembly 100 is flush with, e.g., at the same height as, the surface of the vehicle floor 92. In the example shown in FIG. 12, the reversible panel assembly 100 is positioned in the opening 96 with the first side 12 facing outward, such that in the installed position shown in FIG. 12, the first side 12 is the outwardly facing surface 104 such that the first appearance layer 60 is visible to a vehicle user, and the second side 14 is the inwardly facing surface 106 such that the second appearance layer 70 is contained within the interior compartment 98 and not visible to the vehicle user. In the example shown in FIG. 13, the reversible panel assembly 100 is reversed in the opening 96 from the position shown in FIG. 12, with the second side 14 facing outward, such that in the installed position shown in FIG. 13, the second side 14 is the outwardly facing surface 104 such that the second appearance layer 70 is visible to a vehicle user, and the first side 12 is the inwardly facing surface 106 such that the first appearance layer 60 is contained within the interior compartment 98 and not visible to the vehicle user.

Figure 14:
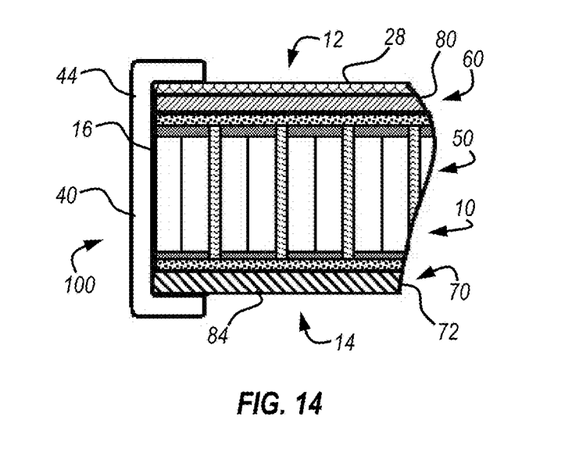
FIG. 14 is a schematic cross-sectional view of the panel assembly of FIG. 12, showing another example of a closure trim element.

FIG. 14 shows another example of a closure trim element 40, which is configured as a molded trim 44, and which is assembled to the perimeter edge 16 of the panel 10 such that the molded trim 42 encapsulates the perimeter edge 16 including enclosing the cells 74 and cavities 76 of the cellular layer 82 at the perimeter edge 16. The molded trim 42 is flanged to extend onto the first and second sides 12, 14 of the panel 10, and in contact with the first and second appearance surfaces 60, 70, to seal the molded trim 42 to the panel 10, thus preventing ingression of contaminants such as fluids, dirt, etc., into the core layer via the perimeter edge 16. In a non-limiting example, the molded trim 42 is made of one of a polymer-based material and a rubber material, which may be pre-formed to conform to the contoured perimeter edge 16, and may include one or more pieces of molded trim which can be assembled to the panel 10 and/or joined to each other to enclosure the perimeter edge 16. In one example, the molded trim 42 is molded as a singular piece, for example, as a generally circular molding, which has sufficient elasticity such that the molded trim 42 can be fitted to the perimeter edge 42 to continuously encircle and enclose the perimeter edge 42 of the panel 10, and to cushion the perimeter edge 16 during insertion of the panel assembly 100 into the opening 96 or compartment 98 being enclosed by the panel assembly 100. The material forming the molded trim 42 may be selected and/or colored to coordinate with other trim elements 30 on the panel assembly 100 and/or one or both of the appearance surfaces 60, 70 and/or other elements of the vehicle into which the panel assembly 100 is installed.

Figure 15:
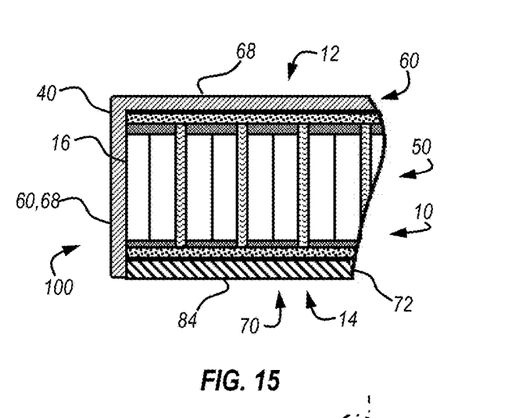
FIG. 15 is a schematic cross-sectional view of the panel assembly of FIG. 12, showing an example of the first appearance layer forming a closure trim element.

In another example shown in FIGS. 3 and 15, the first appearance layer 60 can be formed and bonded to the core member 50, as shown in detail in FIG. 15, such that the first appearance layer 60 extends over and is bonded to the perimeter edge 16 to provide a closure trim 40. In the example shown, the first appearance layer 60 is made from a non-laminated material 68, such as the carpet material shown in FIG. 3, and is wrapped over and bonded to the perimeter edge 16 to enclose the perimeter edge 16, including enclosing the cells 74 and cavities 76 of the cellular layer 82 at the perimeter edge 16. The portion of the non-laminated material 68 which is wrapped over and bonded to the perimeter edge 16 can, depending on the type of material, be bonded to the core member 50 during compression molding of the core member 50, and/or be bonded to the core member 50 in a separate operation using an adhesive applied between the non-laminated material 68 and the perimeter edge 16.

Figure 16:
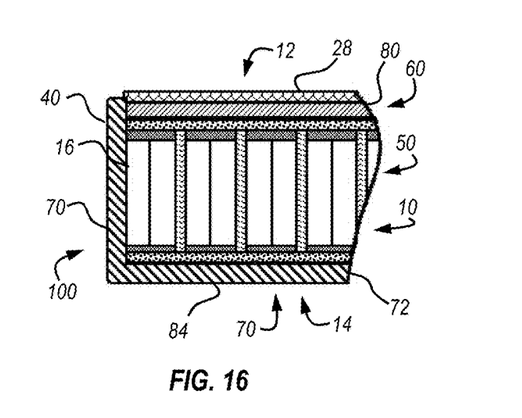
FIG. 16 is a schematic cross-sectional view of the panel assembly of FIG. 12, showing an example of the second appearance layer forming a closure trim element.

In another example shown in FIGS. 11 and 16, the second appearance layer 70 can be formed and bonded to the core member 50, as shown in FIG. 11 in a photographic image of a cross section of the panel 10 of FIGS. 1 and 2 and illustrated schematically in FIG. 16, such that the second appearance layer 70 extends over and is bonded to the perimeter edge 16 to provide a closure trim 40. In the example shown, during forming of the second appearance layer 70, the coating material 72 is applied, e.g., sprayed onto the perimeter edge 16 to form a coating surface 84 which encloses and/or is bonded to the perimeter edge 16, including enclosing the cells 74 and cavities 76 of the cellular layer 82 at the perimeter edge 16. In this example, the first appearance layer 60 may be masked adjacent to the perimeter edge 16 during application of the coating material 72 to prevent overspray of the polyurea material onto the first side 12 of the panel. In one example, the coating material 72 is applied to form a closure trim 40 made of the coating material 72, such that the coating surface 84 forming the closure trim 40 is sealed to the edge of the first appearance layer 60, to enclose the core member 50 to prevent fluid and contaminant ingression to the core member 50 and/or the interface between the core member 50 and the first appearance layer 60. The examples illustrated by the figures are non-limiting, and it would be understood that other configurations of closure trims could be used to enclose the perimeter edge 16.

Figure 17:
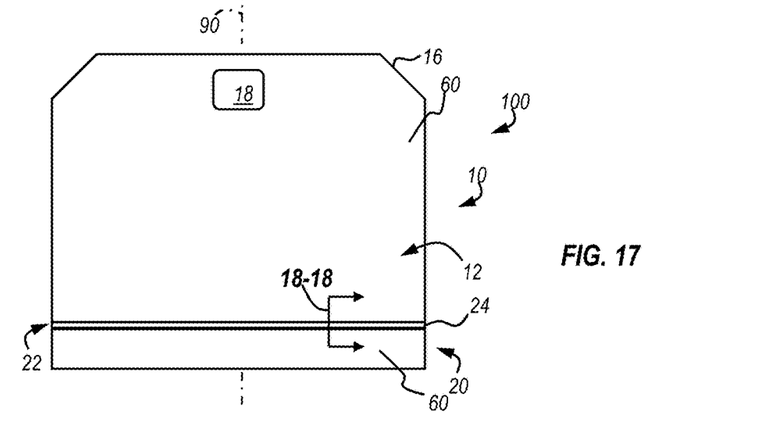
FIG. 17 is a schematic top view of an example panel assembly including a first panel connected by a hinge element to a second panel.
Figure 18:
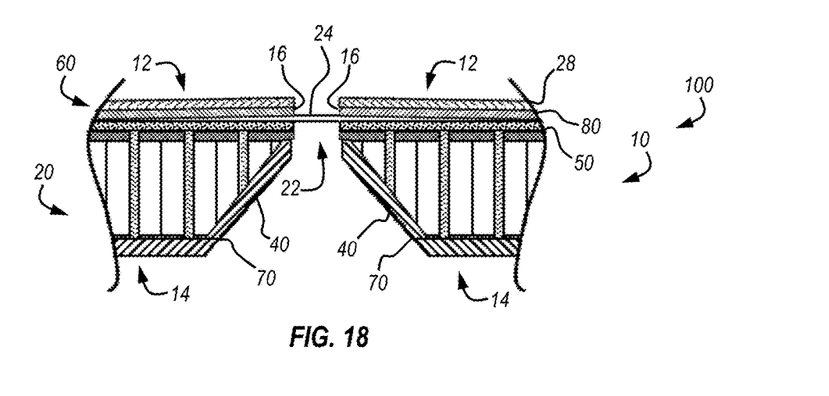
FIG. 18 is a schematic cross-sectional view of section 18-18 of FIG. 17, showing the hinge element in a first example.
Figure 19:
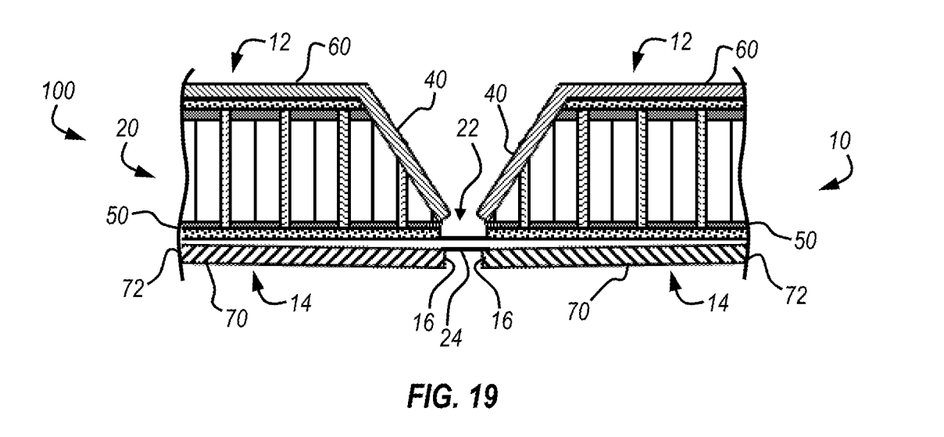
FIG. 19 is a schematic cross-sectional view of section 18-18 of FIG. 17, showing the hinge element in a second example.

Referring to FIGS. 17-19, shown is a panel assembly 100 which includes a first panel 10 and a second panel 20 which are joined, in an illustrative example, by hinge 22 including at least one hinge element 24, such that each of the panels 10, 20 are movable relative to the other via the hinge 22. In the example shown, the first and second panels 10, 20 are of similar construction, as seen in the cross-sectional views shown in FIGS. 18 and 19. This example is non-limiting, and it would be understood that one of the panels 10, 20 can be of a different construction, for example, having a core member 50 formed of a plastic or metal reinforced element or a foam core layer 82, and/or having first and second sides 12, 14 made of the same appearance material. In a non-limiting example, the second panel 20 may be a compression molded panel having first and second appearance layers 60, 70 which are formed of a non-laminate material 68, such as a carpet material coordinated with the carpet material in the vehicle to which the panel assembly 100 is installed. In one example, the first and second panels 10, 20 can be attached by a hinge 22 which includes one or more hinge elements 24 which may be configured as mechanical hinge elements such as barrel hinges, continuous hinges, flag hinges, or piano hinges, fastened to each of the first and second panels 10, 20. In the illustrative examples shown in FIGS. 18 and 19, the first and second panels 10, 20 are joined by a living hinge 22 formed of a hinge element 24 which is attached to each of the first and second panels 10, 20. In the illustrative example shown in FIG. 18, the living hinge 22 includes a hinge element 24 made from a flexible material, such as a textile or fiber reinforced material or tape, which in the present example is inserted between and bonded to the first appearance layer 60 and the core member 50 of each of the first and second panels 10, 20 to form the living hinge 22. In another illustrative example shown in FIG. 19, the living hinge 22 includes a hinge element 24 made from a flexible material, such as a textile or fiber reinforced material or tape, which in the present example is bonded to the core members 50 of each of the first and second panels 10, 20 to form the living hinge 22, where the hinge element 24 is bonded to the core members 50 prior to applying the coating material 72 to form the second appearance layer 70. In the example shown, the second appearance layer 70 is discontinuous between the first and second panels 10. In another example (not shown), the coating material 72 can be applied continuously across the second sides 14 of each of the first and second panels 10, 20, such that the living hinge element 24 is covered by the coating surface 84 formed from the coating material 72. The thickness of the coating material 72 covering the hinge element 24 may be decreased relative to the thickness of the coating material 72 covering the core members 50, to provide for flexibility during bending of the living hinge 22 in use.

The panel assembly 100 provided herein is advantaged by being reversible, e.g., having first and second appearance layers 60, 70 which can be positioned selectively as the exterior and visible side of the panel 10 in an installed condition. As previously described, the reversibility of the panel assembly 100 provides flexibility to install the panel assembly 100 with the first appearance layer 60 visible and as the exterior surface 104 when a decorative appearance is preferred and/or when usage conditions are such that items and materials placed on and/or in contact with the panel 10 are of the type which are not anticipated to deteriorate the condition of the first appearance layer 60, and the flexibility to install the panel assembly 100 with the second appearance layer 70 as the exterior surface 104 when a protective and/or industrial appearance surface is preferred and/or when usage conditions are such that a surface which is resistant to abrasion, chipping, scratching, fluid penetration, dirt, etc. is preferred, for example, and/or to protect the first appearance layer 60 by reversing the panel assembly 100 to have the first appearance layer 60 facing inward. The reversible panel assembly 100 described herein can be used as a panel enclosure and/or load bearing floor panel in vehicles including automobiles, trucks, vans, boats, airplanes, etc., in building floors, decking, etc. The panel assembly 100 can include one or more panels 10, 20 where each panel can enclose one or more interior compartments 98 or multiple interior compartments, and/or multiple panels can enclose a single opening 96. The reversible panel assembly 100 is advantaged by being configured as a lightweight panel, having a core member 50 which has a cellular structure, thus facilitating movement of the panel assembly 100 by a user to reverse the position of the panel assembly 100 and exterior facing side of the panel assembly 100 in use between the first and second sides 12, 14. The example of the cellular structure described herein is non-limiting, and it would be understood that other lightweight configurations of the core member 50, including cellular foam, could be used in the construction of panel 10.

The description of a panel assembly 100 including a first appearance layer 60 which is one of a laminate structure 80 and a non-laminate material 68, and a second appearance layer 70 made of a protective coating material 72 such as a polyurea coating, is non-limiting, and it would be understood that reversible panel assemblies 100 including other combinations of first and second appearance surfaces are anticipated by this disclosure. For example, a reversible panel assembly 100 can include first and second sides 12, 14 where each of the first and second sides 12, 14 has an appearance layer made of the protective coating 72, e.g., where each of the first and second sides 12, 14 is coated with a polyurea material, to provide a panel assembly 100 which is reversible, for instance, when one of the sides 12, 14 becomes soiled, or when the first and second sides 12, 14 are differently configured. In an illustrative example, both the first and second sides 12, 14 can include an appearance surface 70 made of a polyurea coating material 72, where, in the present example, the first side 12 can include rails 34 for moving cargo on and off the load bearing panel 10, and the second side 14 can include a polyurea appearance surface 70 which is textured to prevent equipment, tools, etc., from sliding on the load bearing panel 10, for example, when the vehicle is in motion, or where the cargo area and polyurea surface 70 of the second side 14 is being used as a work surface. In another example, a reversible panel assembly 100 can include first and second sides 12, 14 where the first side 12 includes an appearance layer made of a wood veneer 62 and laminated structure 80, and the second side 14 includes an appearance layer made of a carpeted material 68.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of forming a load bearing panel configured to enclose an opening of an interior compartment; the method comprising:
providing:
a core layer made of a cellular material and defining a perimeter edge;
first and second cover layers made of a polymer material;
a first adhesive part; and
a second adhesive part;
forming a layered structure by:
layering the core layer between the first cover layer and the second cover layer;
spraying the first adhesive part and the second adhesive part on the first cover layer such that the first and second adhesive parts activate to form a first adhesive layer on the first cover layer; and
spraying the first adhesive part and the second adhesive part on the second cover layer such that the first and second adhesive parts activate to form a second adhesive layer on the second cover layer;
inserting the layered structure into a mold; and
molding the layered structure to form a core member;
the method further comprising:
forming a first appearance layer on the core member;
wherein the first appearance layer includes a closure trim;
wherein the closure trim is integral to the first appearance layer and extends continuously from the first cover layer to the second cover layer such that the first appearance layer is sealed to the second cover layer and encapsulates the perimeter edge of the core layer;
wherein the first appearance layer is made of a polyurea material formed by:
spraying, using a two-part spray system, a first component and a second component onto the first cover layer of the core member and directly onto the cellular material defining the perimeter edge of the core layer; and
reacting the first component with the second component during spraying to form the polyurea material.

2. The method of claim 1, wherein molding the layered structure to form the core member further comprises:
migrating the first adhesive layer into the first cover layer and the cellular material to bond the first cover layer to the cellular material;
migrating the second adhesive layer into the second cover layer and the cellular material to bond the second cover layer to the cellular material; and
wherein the first and second adhesive layers are made of a thermoset polymer.

3. The method of claim 1, further comprising:
inserting a second appearance layer into the mold;
wherein the second appearance layer is a laminate structure;
wherein the second appearance layer is layered on the second adhesive layer; and molding the layered structure and second appearance layer such that the second appearance layer is bonded to the second cover layer.

4. The method of claim 3, wherein:
the laminate structure includes a decorative layer made of a wood material.

5. The method of claim 1, further comprising:
bonding a second appearance layer to the second cover layer.

6. The method of claim 5, further comprising:
inserting the second appearance layer into the mold;
wherein the second appearance layer is a carpeting material;
wherein the second appearance layer is layered on the second adhesive layer; and
molding the layered structure and the second appearance layer such that the second appearance layer is bonded to the second cover layer.

7. The method of claim 6, further comprising:
overlapping, in the mold, the second appearance layer over a perimeter edge of the layered structure; and
bonding, via the molding, the second appearance layer to the perimeter edge such that the carpeting material encloses the perimeter edge of the core member.

8. The method of claim 5, wherein the second appearance layer is made of one of a polyurethane and a polyurea material.

9. The method of claim 3, wherein:
the laminate structure includes a decorative layer; and
the decorative layer is made of a metal material.

10. The method of claim 1, wherein:
the first component is made of an isocyanate material; and
the second component is made of a resin material.

11. A method of forming a load bearing panel configured to enclose an opening of an interior compartment; the method comprising:
providing:
a core layer made of a cellular material;
first and second cover layers made of a polymer material;
a first adhesive part; and
a second adhesive part;
forming a layered structure by:
layering the core layer between the first cover layer and the second cover layer;
spraying the first adhesive part and the second adhesive part on the first cover layer such that the first and second adhesive parts activate to form a first adhesive layer on the first cover layer; and
spraying the first adhesive part and the second adhesive part on the second cover layer such that the first and second adhesive parts activate to form a second adhesive layer on the second cover layer;
inserting the layered structure into a mold; and
molding the layered structure to form a core member;
the method further comprising:
forming a first appearance layer on the core member;
wherein the first appearance layer includes at least one of a ridge and a rib;
wherein the first appearance layer is made of a polyurea material formed by:
spraying, using a two-part spray system, a first component and a second component onto the first cover layer of the core member in a variable thickness; and
reacting the first component with the second component during spraying to form the polyurea material in the variable thickness such that the first appearance layer is variable in thickness; and
wherein the at least one of the ridge and the rib is made of the polyurea material and is defined by the variable thickness of the polyurea material.

\* \* \* \* \*